Jan. 22, 1963    J. W. SANDERS    3,074,642
ANALOG ACCUMULATOR
Filed Aug. 26, 1960
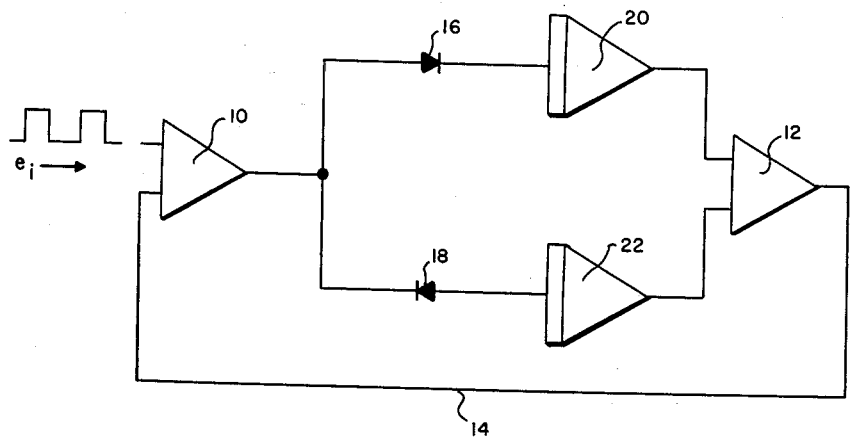
INVENTOR.
JAMES W. SANDERS
BY  E. A. Pettes
ATTORNEY

3,074,642
ANALOG ACCUMULATOR
James W. Sanders, Neptune, N.J., assignor to Electronic Associates Inc., Long Branch, N.J., a corporation of New Jersey
Filed Aug. 26, 1960, Ser. No. 52,180
4 Claims. (Cl. 235—193)

This invention relates generally to an analog accumulator and more particularly to a method and means for obtaining analog representations of digital quantities.

In many areas of computation, simulation and control it is desirable, but not always practical or economically feasible, to obtain analog representation of digital quantities. An example of such a situation is in the area of data processing where it may be desirable to obtain output digital quantities in analog form. Another example where analog quantities are desirable is in the area of synchros where digital quantities are used for purposes of accurate control.

Although not specifically limited thereto, the present invention is directed to a method and means for providing analog representation of digital quantities through the use of the usual and relatively inexpensive apparatus which may be found in the usual general purpose analog computer. In its preferred form the present invention comprises a pair of integrators, each of which is adapted to integrate only one polarity of an applied signal. A first inverting means is connected to receive as input signals and digital data from an external source. A second inverting means is connected to receive the output signals from the integrators. The output signal from the second inverting means is applied directly to the input terminals of the first inverting means.

Upon receiving a first pulse or digital input signal, the output at one of the integrators will rise or fall as the case may be to a value which corresponds to the amplitude of the input pulse. This output is inverted in the second inverting means and applied to the input of the first inverting means to cancel the amplitude of the first input pulse. Intermediate the first and second input pulses no digital input is applied to the first inverting means; however, the output signal from the second inverting means will persist.

The persisting signal is integrated by the other integrator to cancel the amplitude of the signal being applied to the second inverting means. The signals appearing at each of the integrators will now be of the same amplitude and of opposite sign. The analog accumulator of the present invention is now in readiness to receive a second input pulse. With each succeeding input pulse the amplitude of output signal at each integrator will be incremented to a new value which corresponds to the cumulative total of the input pulses. Therefore, it is an object of the present invention to present in analog notation the sum of a plurality of digital signals.

It is another object of the present invention to increment an analog signal in response to digital input pulses.

These and other objects, features and advantages will become apparent from the following description taken in connection with the accompanying drawing, the single FIGURE of which illustrates schematically the preferred embodiment of the invention.

In the figure, the present analog accumulator is shown to comprise a first and second inverting means indicated at 10 and 12. Each inverting means may comprise a suitable transformer or the like, but preferably comprises an amplifier having a high gain, wide band characteristic and may be stabilized by any suitable means, such as by the well known "chopper" stabilizing circuit, details of which are not essential to an understanding of the present invention. The summing juncture of amplifier 10 is connected to receive as input signals the digital pulses shown at $e_i$ as well as the output signals from the amplifier 12. The last voltage amplifying stage of amplifier 12 is coupled directly to the summing juncture of amplifier 10 by a conductor 14.

The last voltage amplifying stage of the amplifier 10 is connected directly to a pair of similar unipolar gates, each of which operate in a series circuit arrangement with a suitable integrator, such as a motor or the like. To this end, the last voltage amplifying stage of the amplifier 10 is shown to be connected directly to the anode and cathode, respectively, of a pair of similar diodes 16, 18. The anode and cathode, respectively, of the diodes 16, 18 are connected to the summing juncture of a pair of integrators 20, 22. The integrators 20, 22 each preferably comprise an amplifier, similar in design to either of the amplifiers 10 or 12, provided with a suitable feedback capacitor, not shown, to perform an integrating operation.

To complete the circuit of the present invention, the last voltage amplifying stages of the integrators 20, 22 are connected directly to the summing juncture of the amplifier 12. For ease of explanation, the inverting amplifiers and the integrators will be considered to have a gain of unity. Furthermore, the digital input pulses $e_i$, as they are applied to the summing juncture of amplifier 10, will be considered to have an amplitude of zero volts to indicate the absence of a pulse and amplitude of plus 1 volt to indicate the presence of a pulse. The time constant of the integrators is considered to be very short; the time constant is variable and is determined and influenced by the expected time duration of the digital input pulses.

Reset means, not shown, such as a shorting switch, may be provided to operate in conjunction with the feedback capacitors provided at the integrators 20, 22. In order to reset the analog accumulator, the capacitors are discharged to a preselected initial condition, such as zero volts.

Assume now that the analog integrator has been reset. Prior to the first input pulse the output from the integrators 20, 22 is zero volts, as is the output signal from the amplifiers 10 and 12. Upon application of the first input pulse the output signal from amplifier 10 will rise to minus 1 volt. This signal will be passed by the diode 18 while being blocked by the diode 16, and the output signal at integrator 22 will rise to an amplitude of plus 1 volt in a period determined by its time constant. In the present example the output from integrator 22 will rise to plus 1 volt well within the duration of the input pulse.

The plus 1 volt output from integrator 22 is inverted by the amplifier 12 and applied to the summing juncture of amplifier 10. Since the input pulse and the signal appearing along conductor 14 are of equal amplitude and of opposite polarity, the input potential to amplifier 10 will be reduced to zero even though the input pulse persists.

Thereafter, in the first instance of absence of an input pulse, the minus 1 volt signal being applied to the amplifier 10 will be passed by the diode 16 and integrated by the integrator 20. Upon this occurrence, the minus 1 volt output from integrator 20 will be canceled by the plus 1 volt output from integrator 22. With each succeeding input pulse the potential output from integrators 20, 22 will be incremented by 1 volt. Obviously, after, for example, 20 input pulses the output at integrator 20 will be minus 20 volts and the output at integrator 22 will be plus 20 volts.

The output signal from either of the integrators may be utilized to energize a suitable indicating device, not shown, in order to provide a cumulative total of the input pulses $e_1$. Alternatively, and by way of example, this analog potential may be utilized within an analog computer or as a signal within a servo feedback loop in order to obtain a desired solution or shaft position.

Although the digital input pulses in the present embodiment are seen to be of unipolar character, it should be apparent to those skilled in the art that the present analog accumulator may accept input pulses of a bipolar character. Upon the occurrence of a positive polarity pulse, the output signal at the integrators will be incremented as described; upon occurrence of subsequent negative polarity pulses, the output signals at the integrators will be similarly incremented, except that the order of operation of the two integrators will be reversed.

While only only one embodiment of the present invention has been shown and described herein and inasmuch as this invention is subject to many variations, modifications and reversals of parts, it is intended that all matter contained herein shall be interpreted as illustrative and not in a limiting sense.

I claim:

1. In a device for accumulating and presenting in analog form the sum of digital signals from a source, the combination comprising a first signal inverting means having input terminals connected to the source, first means for integrating one polarity of output signal from said first signal inverting means, second means for inverting the output from said first integrating means and for applying same to the input terminal of said first signal inverting means, and second means for integrating another polarity of output signal from said first signal inverting means being operatively connected in a parallel circuit arrangement with said first polarity integrating means.

2. In a device for accumulating and presenting in analog form the sum of digital signals from a source, the combination comprising a pair of signal inverting means operatively connected in a series circuit arrangement, said digital source being connected to the input terminal of one of said pair of inverting means, and a pair of unipolar signal integrators operatively connected between the output terminal of one of said inverting means and the input terminals of another of said inverting means for producing output signals amplitude related to the digital signals from said source.

3. In a device for accumulating and presenting in analog form the sum of a plurality of digital signals from a source, the combination comprising a first inverting means connected to receive the digital signals from the source, a pair of integrators connected to receive output signals from said inverting means, and means including a second inverting means connected between the output of said pair of integrators and the input of said first inverting means, each of said pair of integrators being adapted to integrate only one polarity of applied signal, whereby in response to an applied digital signal the output signal from one of said integrators increases from one level of amplitude to another level of amplitude to cancel the digital signal, and thereafter in the absence of a digital signal the output signal from the other of said integrators increases from one level of amplitude to another level of amplitude to cancel at the input of said second inverting means the output signal from the said one integrator.

4. In a device for accumulating and presenting in analog form the sum of digital signals from a source, the combination comprising first signal inverting means having input terminals connected to the source, second signal inverting means including a pair of integrators connected between the output and input terminals of said first signal inverting means for canceling the digital input signal thereto, a diode element disposed within the input circuit of each said integrator, said diode elements being oppositely poled with respect to one another whereby one of said pair of integrators is responsive to one polarity of input signal while the other of said integrators is responsive to an opposite polarity of input signal.

References Cited in the file of this patent
UNITED STATES PATENTS
2,962,217    Landsman _____ Nov. 29, 1960